(12) United States Patent
Meissner et al.

(10) Patent No.: US 9,511,521 B2
(45) Date of Patent: Dec. 6, 2016

(54) PUNCH ARRANGEMENT FOR A PRESS AND PRESS

(75) Inventors: Friedrich Meissner, Schwarzenbek (DE); Daniel Malick, Ahrensburg (DE)

(73) Assignee: Fette Compacting GmbH, Schwarzenbek (DE)

( * ) Notice: Subject to any disclaimer, the term of this patent is extended or adjusted under 35 U.S.C. 154(b) by 0 days.

(21) Appl. No.: 14/116,271

(22) PCT Filed: Apr. 19, 2012

(86) PCT No.: PCT/EP2012/001687
§ 371 (c)(1),
(2), (4) Date: Jan. 24, 2014

(87) PCT Pub. No.: WO2012/152371
PCT Pub. Date: Nov. 15, 2012

(65) Prior Publication Data
US 2014/0127340 A1   May 8, 2014

(30) Foreign Application Priority Data

May 10, 2011 (DE) ........................ 10 2011 101 289

(51) Int. Cl.
*B29C 43/36* (2006.01)
*B30B 11/08* (2006.01)
*B30B 15/00* (2006.01)
*B29C 43/50* (2006.01)

(52) U.S. Cl.
CPC ........... *B29C 43/3607* (2013.01); *B29C 43/50* (2013.01); *B30B 11/08* (2013.01); *B30B 15/0082* (2013.01)

(58) Field of Classification Search
CPC ..................... B29C 43/3607; B30B 15/0082

USPC .................................................. 425/256, 412
See application file for complete search history.

(56) References Cited

U.S. PATENT DOCUMENTS

| | | | |
|---|---|---|---|
| 2005/0008730 A1* | 1/2005 | Trebbi et al. | 425/261 |
| 2006/0147574 A1* | 7/2006 | Harada | B30B 11/08 425/345 |
| 2009/0074901 A1* | 3/2009 | Meissner et al. | 425/345 |

FOREIGN PATENT DOCUMENTS

| | | |
|---|---|---|
| DE | 29516577 | 2/1996 |
| DE | 19926934 | 1/2001 |
| EP | 2186632 | 5/2010 |
| GB | 2261267 A | 5/1993 |
| JP | H04129599 | 11/1992 |

(Continued)

*Primary Examiner* — Alison L Hindenlang
*Assistant Examiner* — Kimberly A Stewart
(74) *Attorney, Agent, or Firm* — Vidas Arrett & Steinkraus

(57) ABSTRACT

Punch arrangement for a press, in particular a rotary press, comprising at least one press punch having a punch head, a tool region and a punch shank extending between the punch head and tool region, further comprising at least one punch guide having at least one guide bore in which the punch shank of the at least one press punch is guided in an axially movable manner and at least one variable length sealing sleeve at least partially surrounding the shank, which sealing sleeve is retained with its first end against the punch shank or against the tool region of the press punch, the sealing sleeve being retained with its second end against an inner wall of the guide bore, the second end of the sealing sleeve, with the punch shank located in the guide bore, being captured between the inner wall of the guide bore and the punch shank. The invention further relates to a press and a rotary press.

13 Claims, 2 Drawing Sheets

(56) References Cited

FOREIGN PATENT DOCUMENTS

| WO | 02/064356 | 8/2002 |
| WO | 2004/085140 | 10/2004 |

\* cited by examiner

PUNCH ARRANGEMENT FOR A PRESS AND PRESS

CROSS-REFERENCE TO RELATED APPLICATIONS

This application is a U.S. National Stage Application which claims priority to PCT/EP2012/001687, filed Apr. 19, 2012, which claims priority to DE 10 2011 101 289.7 filed May 10, 2011, the entire contents of which are incorporated by reference.

STATEMENT REGARDING FEDERALLY SPONSORED RESEARCH

Not applicable

BACKGROUND OF THE INVENTION

The invention relates to a punch arrangement for a press, in particular a rotary press, comprising at least one press punch having a punch head, a tool region and a punch shank extending between the punch head and the tool region, further comprising at least one punch guide having at least one guide bore in which the punch shank of the at least one press punch is guided in an axially movable manner and at least one variable length sealing sleeve at least partially surrounding the punch shank, which sealing sleeve is retained with its first end against the punch shank or against the tool region of the press punch. The invention further relates to a press and a rotary press.

It is known to provide a seal between a compression chamber of a press and a punch guide, in particular guide bores, via variable length sealing sleeves. Such an arrangement is disclosed, for example, in DE 295 16 577 U1. In this case, a sealing sleeve configured as a folding bellows is retained at its one end by an annular fastening portion in an annular groove of a press punch. At its other end, the sealing sleeve is also retained by an annular fastening portion in an annular groove of a retaining portion configured on the punch guide. The retaining portion with the annular groove protrudes downwardly from the guide bore of the punch guide.

In the known construction, the folding bellows has a relatively loose fit in the annular groove of the retaining portion protruding downwardly from the guide bore. With the rapid axial movements of the press punch during the operation of the press, therefore, the folding bellows may be released from the annular groove of the retaining portion. The seal between the compression chamber and the guide bore is thus no longer ensured, potentially resulting in damage to the punch guide and contamination of the pellets produced and thus to production waste. It may also result in compression of the released folding bellows. A further drawback of the known design is that the retaining portion limits the maximum stroke of the press punch. Moreover, in the known construction cleaning is relatively complex.

In certain applications, it is desirable to provide a so-called stripping element instead of a sealing sleeve. Such stripping elements are located in the region of the outlet of the guide bore facing the compression chamber and bear sealingly against the press punch in the peripheral direction of the punch shank. During the lifting movements of the press punch occurring during operation, the stripping element brushes over the surface of the punch shank in the axial direction and at the same time brushes away contaminants from the punch shank. In the known devices, the stripping elements are either pressed into a groove by their metal cage or by a suitable external geometry. In the known devices, the fastening devices for the stripping elements differ from the fastening devices for the sealing sleeves. As a result, changing between the sealing sleeves and the stripping elements is only possible in a complex manner. This applies, in particular, to rotary presses when the rotor is designed to remain in the tablet press. Generally, adapter rings are required for changing between the sealing sleeves and the stripping elements, which are only able to be mounted and dismantled using special tools. This leads to long changeover times and damage when used incorrectly.

Proceeding from the aforementioned prior art, therefore, the object of the invention is to provide a punch arrangement, a press and a rotary press of the type mentioned in the introduction, in which the operational reliability is increased, the maximum punch stroke is increased, the changeover is facilitated when changing between the sealing sleeve and the stripping ring and the changeover time required therefor shortened and the cleaning simplified.

BRIEF SUMMARY OF THE INVENTION

For a punch arrangement of the type mentioned in the introduction, the invention achieves the object by the sealing sleeve being retained with its second end against an inner wall of the guide bore, the second end of the sealing sleeve, with the punch shank located in the guide bore, being captured between the inner wall of the guide bore and the punch shank.

The punch arrangement according to the invention is provided for use in a press, in which for example a powdery material is compressed by the press punches to form pellets. The pellets may be tablets. The press may be a rotary press which is known per se. The punch arrangement has one press punch or a plurality of press punches, for example a plurality of upper press punches and lower press punches. The punch arrangement also has an upper punch guide and/or lower punch guide for the press punch with at least one guide bore, preferably a plurality of guide bores. In each case, one press punch is guided in an axially movable manner with its shank in each guide bore.

The punch arrangement according to the invention further comprises at least one sealing sleeve, preferably a plurality of sealing sleeves, in each case at least one sealing sleeve partially surrounding the shank of one respective press punch. In this case, the sealing sleeve may surround the entire portion of the punch shank protruding from the guide bore during the axial stroke of the press punch. The sealing sleeve is designed, on the one hand, to avoid contamination of the compression chamber, for example by lubricant for the punch shanks provided in the punch guides. On the other hand, said sealing sleeve is intended to prevent the penetration of dust, for example from the generally powdery material to be compressed, into the punch guide, in particular the guide bore. To this end, the sealing sleeve is fastened with its one end to the punch shank, in particular in the region of the end of the punch shank facing the tool region, or is fastened to the punch tool. The sealing sleeve may be located at this end, for example, with a fastening ring in an annular groove of the shank or the punch tool. However, further types of fastening are also conceivable (for example positive and/or non-positive connections by fixing, clamping, etc). During operation, with an axial movement of the press punch said end of the sealing sleeve moves with the press punch in the axial direction. The other end of the sealing sleeve according to the invention is retained against an inner wall of the guide bore, in particular in the vicinity of the end of the guide bore facing the compression chamber. The retention of said end of the sealing sleeve is such that the sealing sleeve, with the press punch inserted into the guide bore, is captured between the inner wall of the guide bore and the punch shank. This means that when the press punch is inserted in the guide bore, said end of the sealing sleeve is not able to be released from its retained position against the inner wall of the guide bore, which now also becomes the positive captured position, and thus not able to be released from the guide bore.

During the installation of the punch arrangement, the sealing sleeve is initially inserted with its second end into its retained position against the inner wall of the guide bore. Subsequently, the press punch is inserted into the guide bore so that then the sealing sleeve with its second end is no longer able to be released from the guide bore and thus is in its retained and captured position. Subsequently, the sealing sleeve may be fastened with its other end to the punch shank or punch tool. An undesired release of the sealing sleeve and thus loss of sealing action may be reliably avoided according to the invention. Moreover, additional space is obtained for the maximum punch stroke in the axial direction as the retaining means are provided for the second end of the sealing sleeve inside the guide bore and do not protrude from the guide bore in the direction of the compression chamber and thus do not limit the lifting stroke of the press punch as in the prior art. Moreover, the cleaning of the construction according to the invention is simpler in comparison with the prior art.

In a manner known per se, with an axial movement of the press punch, the sealing sleeve is compressed and/or stretched in the axial direction between its second end retained fixedly against the inner wall of the guide bore and its first end fastened to the press punch and movable therewith. In a particularly expedient manner, therefore, the sealing sleeve may consist of an elastomer.

The second end of the sealing sleeve may comprise a fastening ring which is received in an annular groove configured in the inner wall of the guide bore, said annular groove opening towards the punch shank. The fastening ring of the sealing sleeve is inserted into the annular groove. Thus a particularly secure retention against the inner wall of the guide bore is achieved. The fastening ring may be of resilient configuration so that it is able to be latched into the annular groove and/or clipped therein.

According to a further embodiment, the second end of the sealing sleeve, with the punch shank located in the guide bore, may form a seal between the inner wall of the guide bore and the punch shank. The seal is such that, in particular, contaminants from the compression chamber, such as pressing dust or contaminants from the guide bore, such as lubricant, are not able to be conducted past the sealing sleeve out of the compression chamber into the guide bore or vice versa. The preferably resilient configuration of the second end of the sealing sleeve makes it possible to embed said second end into the annular groove by means of pretensioning, whereby the desired sealing action is further increased. According to a particularly expedient embodiment, the sealing sleeve may be configured as a folding bellows or corrugated tube.

A further embodiment of the invention, therefore, provides that the press according to the invention also comprises at least one stripping element which is also retained against the inner wall of the guide bore, said stripping element, with the punch shank located in the guide bore, also being captured between the inner wall of the guide bore and the punch shank, the stripping element comprising a stripping ring which, with the punch shank located in the guide bore, bears sealingly over the entire periphery of the punch shank and, with an axial movement of the punch, brushes in the axial direction along the punch shank and the stripping element being retained against the inner wall of the guide bore by retaining and capture means identical to those of the sealing sleeve. In particular, in this embodiment the stripping ring bears sealingly against the entire periphery of the punch shank.

The stripping element and/or the stripping elements according to the invention generally comprise a resilient sealing ring which sealingly bears against the periphery of the punch shank and, with the axial movement of the press punch occurring during operation, sealingly brushes past said press punch. As a result, in the known manner contamination from the press punch is brushed away in both axial directions, irrespective of whether this originates from the compression chamber (for example pressing dust) or from the punch guide (for example lubricant for the punch). The contamination, therefore, is not able to enter the guide bore from the compression chamber or vice versa. The sealing ring may have, for example, a C-shaped profile in cross section, the two free ends of the C-shaped profile bearing against the surface of the punch shank. As a result, a particularly secure barrier is provided between the guide bore and the compression chamber.

The stripping elements and the sealing sleeves according to the invention are fastened in a mutually compatible manner to the inner wall of the guide bore, said fastening maintaining the retention and capture thereof. To this end, the retaining means and capture means for the stripping elements may be configured to be identical to the retaining means and capture means for the sealing sleeves. Thus a particularly simple and rapid changeover between using the sealing sleeves and using the stripping elements is possible without adapter rings or particular tools being required for the changeover. As a result, when the stripping elements and/or sealing sleeves are removed, the cleaning is simplified relative to the prior art. At the same time, an undesirable release both of the sealing sleeves and the stripping elements is reliably prevented. In turn, the at least one stripping element may comprise a fastening ring which is received in an annular groove received in the inner wall of the guide bore. The fastening ring may be of identical configuration to the above-mentioned fastening ring of the sealing sleeve.

The invention also relates to a press comprising at least one punch arrangement according to the invention. The invention also relates to a rotary press comprising a rotor which is generally rotatable about a vertical axis, the rotor comprising an upper punch arrangement and a lower punch arrangement with an upper punch guide and a lower punch guide as well as a plurality of upper press punches and a plurality of lower press punches and comprising a die table between the punch guides, the press punch cooperating with receivers of the die table, and comprising at least one filling and metering station in which material to be compressed is filled into the receivers, and comprising at least one compression station in which the material filled into the receivers is compressed by the upper press punch and lower press punch to form pellets, the upper punch arrangement and/or the lower punch arrangement being configured in the manner according to the invention. The receivers may be so-called die bores. Die bushings may be arranged in the die bores. This is not, however, absolutely necessary.

The press punches may also cooperate directly with the die bores. The die table may be configured in one piece. It may, however, also consist of die segments.

BRIEF DESCRIPTION OF THE SEVERAL VIEWS OF THE DRAWINGS

Exemplary embodiments of the invention are described in more detail hereinafter with reference to the figures, in which schematically.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
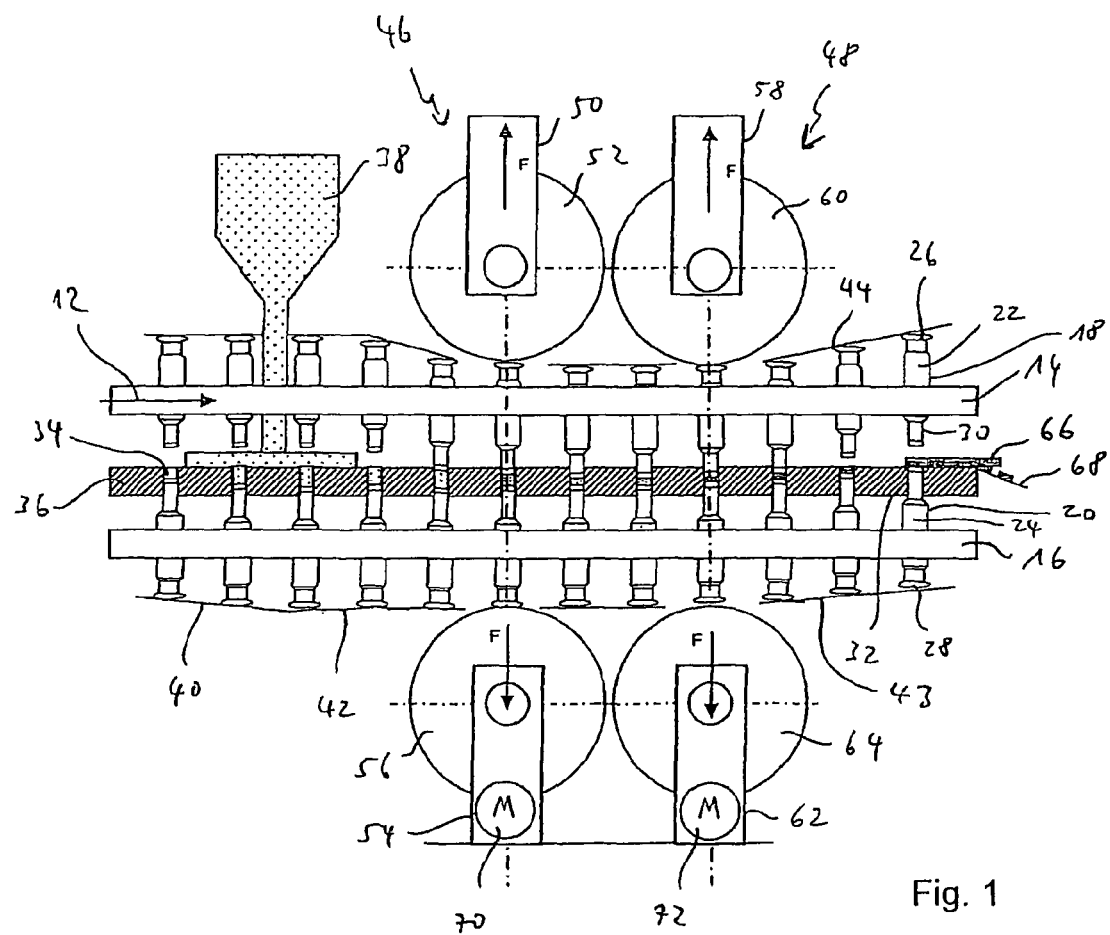
FIG. 1 shows part of a rotary press in a view developed in the plane of the drawing.

Provided nothing further is specified, the same reference numerals denote the same subjects of the invention. FIG. 1 shows the construction of a rotary tablet press known per se. In particular, the rotor of the rotary tablet press is shown, said rotor being rotated by a rotary drive, not shown, about a generally vertical axis, as illustrated by the arrow 12. The rotor comprises a punch arrangement with an upper punch guide 14 and a lower punch guide 16. The upper and lower punch guides 14, 16 in each case comprise guide bores for receiving upper punches 18 and lower punches 20 of the press. In a manner known per se, the upper punch and lower punch 18, 20 in each case comprise a punch shank 22, 24 which in each case extends between a punch head 26, 28 and a tool region 30, 32. The upper punch and lower punch 18, 20 cooperate by their tool regions 30, 32 with receivers 34, for example die bores, of a die table 36, which is arranged between the punch guides 14, 16. The rotary tablet press further comprises a filling and metering station with a filling device 38, via which powdery pressing material is supplied to the receivers 34. The filling and metering station of the press further comprises curved filling elements 40 and curved metering elements 42. The rotor also comprises lower curved ejection elements 43 and upper curved lifting elements 44.

A pre-compression station 46 and a main compression station 48 are arranged downstream in the rotational direction 12 of the rotor of the filling device 38. The pre-compression station 46 has an upper compression device 50 with an upper compression roller 52 and a lower compression device 54 with a lower compression roller 56. The main compression station 48 also comprises an upper compression device 58 with an upper compression roller 60 and a lower compression device 62 with a lower compression roller 64. The upper and lower punches 18, 20 cooperate with the compression rollers 52, 56, 60, 64 in a manner known per se, in order to compress the pressing material filled into the receivers 34 to form tablets. Arranged downstream in the rotational direction 12 of the pre-compression station and the main compression station 46, 48 is an ejection station with a stripper 66 which at this time supplies pellets and/or tablets, pushed by the lower punches 20 to the surface of the die table 36, to a tablet outlet 68.

It should also be mentioned that the lower compression devices 54, 62 in each case comprise a motorised drive 70, 72 by which the vertical distance between the upper compression rollers 52, 60 and the lower compression rollers 56, 64 may be varied. As illustrated in FIG. 1 by the arrows denoted by F, during operation of the press, forces act between the upper punches and/or lower punches 18, 20 and the compression rollers 52, 56, 60, 64.

Figure 2:
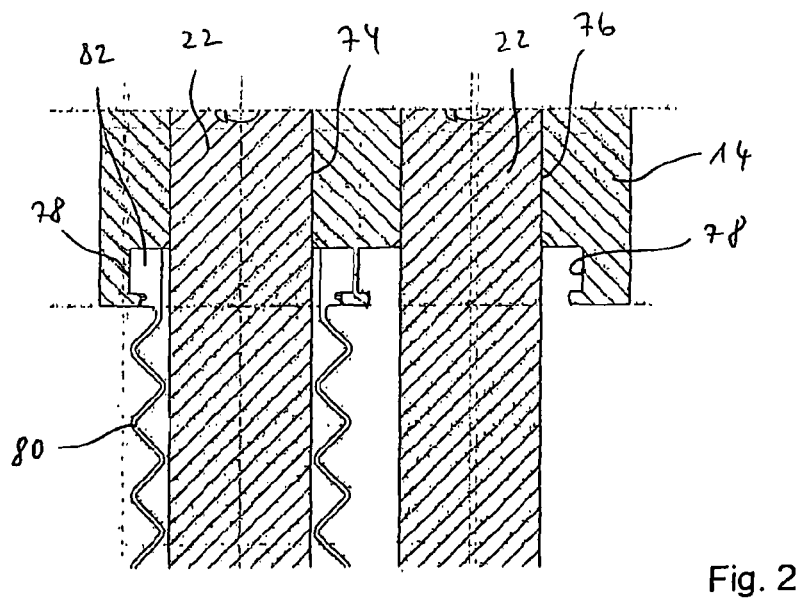
FIG. 2 shows a detail of punch arrangement according to the invention in the region of a second end of a sealing sleeve in a sectional view.

In FIG. 2, a detail of a punch arrangement is shown in a vertical section, as may be provided in the rotary tablet press shown in FIG. 1. The upper punch guide 14 is visible, two guide bores 74, 76 of the punch guide 14 being visible in the view in FIG. 2. In the guide bores 74, 76 one respective press punch 18 is movably guided in the axial direction. The respective punch shanks 22 of the press punches 18 may be seen in FIG. 2. It goes without saying that all of the guide bores of the upper punch guide 14 and optionally also of the lower punch guide 16 may be designed in the manner described in FIG. 2 and also as described below relative to FIG. 3. The same applies to the upper and lower press punches 18, 20. It goes without saying that the upper and/or lower punch guide 14, 16 may also be constructed in multiple parts.

In FIG. 2 it may be seen that at their lower end in FIG. 2 assigned to the compression chamber with the die table 36, the guide bores 74, 76 are provided on their inner wall with an annular groove 78. A sealing sleeve 80 in the form of a folding bellows or corrugated tube is arranged on the press punch 18 arranged in the left-hand guide bore 74 in FIG. 2, of which in FIG. 2 only the upper second end may be seen. The sealing sleeve 80 consists, for example, of an elastomer and is of variable length in the direction of movement of the press punch 18. The lower first end of the sealing sleeve 80, not visible in FIG. 2, is fastened via suitable fastening means to the punch shank 22 or the tool region 30 of the respective press punch 18. The upper second end of the sealing sleeve 80 shown in FIG. 2 has a resilient fastening ring 82 which is arranged in the annular groove 78 of the guide bore 74. In particular, when the press punch 18 is not yet inserted into the guide bore 74, the resilient fastening ring 82 is clipped into the annular groove 78 and/or latched therein. Subsequently, the press punch 18 is inserted with its punch shank 22 into the guide bore 74. As a result, the sealing sleeve 80 with its fastening ring 82 is captured between the inner wall of the guide bore 74 formed by the annular groove 78 and the punch shank 22. As may be seen clearly from FIG. 2, in this state the sealing sleeve 80 with its fastening ring 82 is no longer able to be released from the annular groove 78. In FIG. 2, for reasons of clarity, no sealing sleeve 80 is shown in the right-hand guide bore 76. It goes without saying that a corresponding sealing sleeve 80 may also be provided here.

Figure 3:
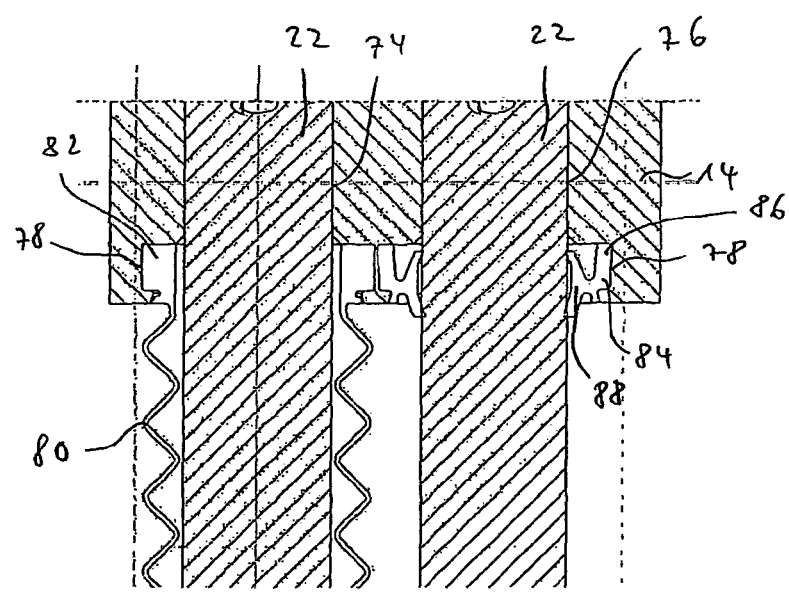
FIG. 3 shows the detail of FIG. 2 according to a further exemplary embodiment in the region of the second end of the sealing sleeve and a stripping element in a sectional view.

In FIG. 3, a further exemplary embodiment of the punch arrangement according to the invention of FIG. 2 is shown. This exemplary embodiment corresponds substantially to the exemplary embodiment of FIG. 2. In contrast to FIG. 2, however, a stripping element 84 is arranged in the annular groove 78 of the right-hand punch arrangement 76 in FIGS. 2 and 3. The stripping element 84 also has a resilient fastening ring 86 which in its geometric dimensions is designed so that it may be inserted in a latching manner in said annular groove 78 or clipped therein, as is the fastening ring 82 of the sealing sleeve 80. The stripping element 84 also comprises a sealing ring 88 which is C-shaped in cross section, which via the periphery of the punch shank 22 bears sealingly with its two ends against the surface of the punch shank 22. The stripping element 84 may, for example, consist of a suitable elastomer.

As the fastening rings 82, 86 of the sealing sleeves 80, on the one hand, and the stripping elements 84, on the other hand, are designed to be compatible with one another, the sealing sleeves 80 and the stripping elements 84 may be inserted in a simple manner in said annular grooves 78 of the guide bores 74, 76. In this manner a rapid and simple exchange between sealing sleeves 80 and stripping elements 84 is possible without adapters or special tools being required.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A punch arrangement for a press, comprising at least one press punch (18, 20) having a punch head (26, 28), a tool region (30, 32) and a punch shank (22, 24) extending between the punch head (26, 28) and tool region (30, 32), further comprising at least one punch guide (14, 16) having at least one guide bore (74, 76) in which the punch shank (22, 24) of the at least one press punch (18, 20) is guided in an axially movable manner and at least one variable length sealing sleeve (80) at least partially surrounding the punch shank (22, 24), which the at least one sealing sleeve is retained with its first end against the punch shank (22, 24) or against the tool region (30, 32) of the at least one press punch (18, 20), characterised in that the at least one sealing sleeve (80) is retained with its second end against an inner wall of the at least one guide bore, the second end of the at least one sealing sleeve (80), being positive captured between the punch shank (22, 24) and the inner wall of the at least one guide bore that opposes the punch shank and otherwise retained by a guide bore surface that does not oppose the punch shank;

wherein, when the press punch is inserted in the at least one guide bore, the second end of the at least one sealing sleeve is not able to be released from its positive captured position against the inner wall of the at least one guide bore and thus not able to be released from the at least one guide bore.

2. The punch arrangement according to claim 1, characterised in that the second end of the at least one sealing sleeve (80) comprises a fastening ring (82) which is received in an annular groove (78) configured in the inner wall of the at least one guide bore (74, 76).

3. The punch arrangement according to claim 1, characterised in that the second end of the at least one sealing sleeve (80), with the punch shank (22, 24) located in the at least one guide bore (74, 76), forms a seal between the inner wall of the at least one guide bore (74, 76) and the punch shank (22, 24).

4. The punch arrangement according to claim 2, characterised in that the second end of the at least one sealing sleeve (80) is received by pretensioning in the annular groove (78).

5. The punch arrangement according to claim 2, characterised in that the second end of the at least one sealing sleeve (80) is of resilient configuration and is latched into the annular groove (78) or clipped therein.

6. The punch arrangement according to claim 1, characterised in that the at least one sealing sleeve (80) is configured as a folding bellows or corrugated tube.

7. The punch arrangement according to claim 2, characterised in that a stripping element (84) comprises the fastening ring (86) which is received in the annular groove (78) configured in the inner wall of the at least one guide bore (74, 76).

8. A press comprising at least one punch arrangement according to claim 1.

9. A rotary press comprising a rotatable rotor, the rotor comprising an upper punch arrangement and a lower punch arrangement with an upper punch guide and a lower punch guide (14, 16) as well as a plurality of upper press punches and a plurality of lower press punches (18, 20), and comprising a die table (36) between the punch guides (14, 16), the press punches (18, 20) cooperating with receivers (34) of the die table (36), and comprising at least one filling and metering station in which material to be compressed is filled into the receivers (34), and comprising at least one compression station (46, 48) in which the material filled into the receivers (34) is compressed by the upper press punch and lower press punch (18, 20) to form pellets, characterised in that the upper punch arrangement and/or the lower punch arrangement is configured according to claim 1.

10. A punch arrangement for a press comprising: a rotary press, having at least one press punch (18, 20) having a punch head (26, 28), a tool region (30, 32) and a punch shank (22, 24) extending between the punch head (26, 28) and tool region (30, 32), further comprising at least one punch guide (14, 16) having at least one guide bore (74, 76) in which the punch shank (22, 24) of the at least one press punch (18, 20) is guided in an axially movable manner and at least one variable length sealing sleeve (80) at least partially surrounding the punch shank (22, 24), which the at least one sealing sleeve is retained with its first end against the punch shank (22, 24) or against the tool region (30, 32) of the at least one press punch (18, 20), wherein the at least one sealing sleeve (80) is retained with its second end against an inner wall of the at least one guide bore (74, 76), the second end of the at least one sealing sleeve (80), being positive captured between the punch shank (22, 24) and the inner wall of the at least one guide bore that opposes the punch shank and otherwise retained by a guide bore surface that does not oppose the punch shank, wherein, when the press punch is inserted in the at least one guide bore, the second end of the at least one sealing sleeve is not able to be released from its retained position against the inner wall of the at least one guide bore and thus not able to be released from the at least one guide bore;

further wherein the second end of the at least one sealing sleeve (80) comprises a fastening ring (82) which is received in an annular groove (78) configured in the inner wall of the at least one guide bore (74, 76) and wherein the annular groove (78) is defined in part by a ledge, wherein a shortest radial distance from the ledge to the punch shank is less than a radial thickness of the fastening ring 82, and further wherein the second end of the at least one sealing sleeve (80) is received by pretensioning in the annular groove (78).

11. The punch arrangement according to claim 10, further comprising at least one stripping element (84) which is also retained against the inner wall of the at least one guide bore (74, 76), said stripping element, with the punch shank (22, 24) located in the at least one guide bore (74, 76), also being captured between the inner wall of the at least one guide bore (74, 76) and the punch shank (22, 24), the stripping element (84) comprising a stripping ring (88) which, with the punch shank (22, 24) located in the at least one guide bore (74, 76), bears sealingly against the periphery of the punch shank (22, 24) and with an axial movement of the at least one press punch (18, 20) brushes along the punch shank (22, 24) in the axial direction and the stripping element (84) being retained against the inner wall of the at least one guide bore (74, 76).

12. A rotary press comprising:
a rotatable rotor, the rotor comprising an upper punch arrangement and a lower punch arrangement with an upper punch guide and a lower punch guide (14, 16) as well as a plurality of upper press punches and a plurality of lower press punches (18, 20), wherein at least one of the upper punch arrangement and lower punch arrangement comprises:
at least one press punch (18, 20) comprising a punch head (26, 28), a tool region (30, 32) and a punch shank (22, 24) extending between the punch head (26, 28) and tool region (30, 32);
wherein at least one of the upper punch guide and the lower punch guide (14, 16) has at least one guide bore (74, 76) in which the punch shank (22, 24) of the at least one press punch (18, 20) is guided in an axially movable manner and at least one variable length sealing sleeve (80) at least partially surrounding the punch shank (22, 24), which the at least one sealing sleeve is retained with its first end against the punch shank (22, 24) or against the tool region (30, 32) of the at least one press punch (18, 20);
wherein the at least one sealing sleeve (80) is retained with its second end against an inner wall of the at least one guide bore (74, 76), the second end of the at least one sealing sleeve (80), with the punch shank (22, 24) located in the at least one guide bore (74, 76), being positive captured between the punch shank (22, 24) and the inner wall of the at least one guide bore that opposes the punch shank and otherwise retained by a guide bore surface that does not oppose the punch shank; wherein, when the at least one press punch is inserted in the at least one guide bore, the second end of the at least one sealing sleeve is not able to be released from its positive captured position against the inner wall of the at least one guide bore and thus not able to be released from the at least one guide bore; a die table (36) between the punch guides (14, 16), the press punches (18, 20) cooperating with receivers (34) of the die table (36),
at least one filling and metering station in which material to be compressed is filled into the receivers (34), and at least one compression station (46, 48) in which the material filled into the receivers (34) is compressed by the upper press punch and lower press punch (18, 20) to form pellets.

13. A punch arrangement for a press, comprising at least one press punch (18, 20) having a punch head (26, 28), a tool region (30, 32) and a punch shank (22, 24) extending between the punch head (26, 28) and tool region (30, 32), further comprising at least one punch guide (14, 16) having at least one guide bore (74, 76) in which the punch shank (22, 24) of the at least one press punch (18, 20) is guided in an axially movable manner and at least one variable length sealing sleeve (80) at least partially surrounding the punch shank (22, 24), which the at least one sealing sleeve is retained with its first end against the punch shank (22, 24) or against the tool region (30, 32) of the at least one press punch (18, 20),
characterised in that the at least one sealing sleeve (80) is retained with its second end against an inner wall of the at least one guide bore (74, 76), the second end of the sealing sleeve (80), being positive captured between the punch shank (22, 24) and the inner wall of the at least one guide bore that opposes the punch shank and otherwise retained by a guide bore surface that does not oppose the punch shank; wherein, when the at least one press punch is inserted in the at least one guide bore, the second end of the at least one sealing sleeve is not able to be released from its positive captured position against the inner wall of the at least one guide bore and thus not able to be released from the at least one guide bore;
further wherein the second end of the at least one sealing sleeve (80) comprises a fastening ring (82) which is received in an annular groove (78) configured in the inner wall of the at least one guide bore (74, 76) and wherein the annular groove (78) is defined in part by a ledge, wherein a shortest radial distance from the ledge to the punch shank is less than a radial thickness of the fastening ring 82, and
further wherein the second end of the at least one sealing sleeve (80) is received by pretensioning in the annular groove (78).

* * * * *